United States Patent
Hipol et al.

(10) Patent No.: US 12,397,526 B2
(45) Date of Patent: Aug. 26, 2025

(54) ACOUSTIC WAVE TRANSFORMATION AND ATTENUATION MEMBRANE

(71) Applicant: MAPEI S.p.A., Milan (IT)

(72) Inventors: Philip J. Hipol, Deerfield Beach, FL (US); Betiana Acha, Deerfield Beach, FL (US); Louis L. Grube, Deerfield Beach, FL (US)

(73) Assignee: MAPEI S.P.A., Milan (IT)

( * ) Notice: Subject to any disclaimer, the term of this patent is extended or adjusted under 35 U.S.C. 154(b) by 328 days.

(21) Appl. No.: 17/821,856

(22) Filed: Aug. 24, 2022

(65) Prior Publication Data
US 2023/0085623 A1     Mar. 23, 2023

Related U.S. Application Data (60) Provisional application No. 63/243,980, filed on Sep. 14, 2021.

(51) Int. Cl.
*B32B 3/12* (2006.01)
*B32B 3/26* (2006.01)
(Continued)

(52) U.S. Cl.
CPC ............... *B32B 3/12* (2013.01); *B32B 3/266* (2013.01); *B32B 7/12* (2013.01); *B32B 2250/03* (2013.01);
(Continued)

(58) Field of Classification Search
CPC .......... E04F 15/206; E04F 15/20; B32B 3/12; B32B 7/12; B32B 3/266; B32B 2250/03;
(Continued)

(56) References Cited

U.S. PATENT DOCUMENTS

| | | | | | |
|---|---|---|---|---|---|
| 4,404,889 A | * | 9/1983 | Miguel | .................... | B32B 15/14 |
| | | | | | 89/36.02 |
| 7,181,891 B2 | * | 2/2007 | Surace | ...................... | E04B 1/86 |
| | | | | | 52/642 |

(Continued)

FOREIGN PATENT DOCUMENTS

| CN | 108756140 A | * | 11/2018 | ............... | B27D 1/04 |
|---|---|---|---|---|---|
| CN | 210257481 U | * | 4/2020 | | |

(Continued)

OTHER PUBLICATIONS

English translation of CN 211307733 U, accessed Jan. 21, 2025 via Espacenent; <https://translationportal.epo.org/emtp/translate/?ACTION=description-retrieval&COUNTRY=CN&ENGINE=google&FORMAT=docdb&KIND=U&LOCALE=en_EP&NUMBER=211307733&SRCLANG=zh&TRGLANG=en> (Year: 2020).*

(Continued)

*Primary Examiner* — Jeremy A Luks
(74) *Attorney, Agent, or Firm* — Rothwell, Figg, Ernst & Manbeck, P.C.

(57) ABSTRACT

Methods and apparatuses for reducing the transmission of unwanted sound and vibration energy generated by dynamic and/or impact loads through floors in multi-story buildings. This may be accomplished using an acoustic wave transformation and attenuation sound proofing membrane including an acoustic wave transformation layer, an acoustic absorption layer, and a constrained vibration damping layer. The acoustic wave transformation layer may be capable of transforming acoustic waves in a manner that may easily be attenuated by the acoustic absorption and constrained vibration damping layers. The sound proofing membrane may be used with several different combinations of floor coverings, adhesives, and subfloors. Impact acoustical tests have demonstrated that the sound proofing membrane can achieve higher IIC and HIIC ratings compared to conventional (Continued)

acoustic underlayments and/or membranes and, thus, prevent unwanted dynamic and/or impact loads from disturbing occupants in rooms beneath the floor assembly.

48 Claims, 6 Drawing Sheets

(51) Int. Cl.
*B32B 7/12* (2006.01)
*E04F 15/10* (2006.01)
*E04F 15/20* (2006.01)

(52) U.S. Cl.
CPC ....... *B32B 2250/05* (2013.01); *B32B 2250/40* (2013.01); *B32B 2307/102* (2013.01); *B32B 2307/558* (2013.01); *B32B 2307/72* (2013.01); *B32B 2307/7265* (2013.01); *B32B 2419/00* (2013.01); *E04F 15/107* (2013.01); *E04F 15/206* (2013.01)

(58) Field of Classification Search
CPC ............ B32B 2250/00; B32B 2250/40; B32B 2307/102; B32B 2307/558; B32B 2307/72; B32B 2307/7265; B32B 2419/00
See application file for complete search history.

(56) References Cited

U.S. PATENT DOCUMENTS

| | | | | |
|---|---|---|---|---|
| 8,590,670 B1* | 11/2013 | Grube | ................... | E04F 15/182 |
| | | | | 181/294 |
| 2010/0018799 A1* | 1/2010 | Boyadjian | ............... | E04F 15/02 |
| | | | | 181/290 |
| 2010/0261023 A1* | 10/2010 | Ravnaas | .................. | E04B 1/86 |
| | | | | 428/521 |

FOREIGN PATENT DOCUMENTS

| | | | | |
|---|---|---|---|---|
| CN | 211307733 U | * | 8/2020 | |
| CN | 112780042 A | * | 5/2021 | .............. E04F 15/02 |
| DE | 102007024356 A1 | * | 11/2008 | .............. B32B 15/08 |
| EP | 2636514 A1 | * | 9/2013 | ........... B29C 70/088 |
| JP | 2014114689 A | * | 6/2014 | |
| KR | 102274040 B1 | * | 7/2021 | |
| WO | 2020/007918 A1 | | 1/2020 | |
| WO | 2021/018903 A1 | | 2/2021 | |

OTHER PUBLICATIONS

English translation of CN 108756140 A, accessed Jan. 21, 2025 via Espacenet; <https://translationportal.epo.org/emtp/translate/?ACTION=description-retrieval&COUNTRY=CN&ENGINE=google&FORMAT=docdb&KIND=A&LOCALE=en_EP&NUMBER=108756140&SRCLANG=zh&TRGLANG=en> (Year: 2018).*
Web Archive for Soy New Uses website, Common Use: Adhesives, Apr. 25, 2020, <https://web.archive.org/web/20200425164339/https://soynewuses.org/common-uses/adhesive/> (Year: 2020).*
GB/T 50121-2005, Chinese Rating Standard of Sound Insulation in Buildings, <https://www.eia543.com/documents/02%E5%A3%B0/%E5%BB%BA%E7%AD%91%E9%9A%94%E5%A3%B0%E8%AF%84%E4%BB%B7%E6%A0%87%E5%87%86%EF%BC%88GB%20T%2050121-2005%EF%BC%89.pdf> (Year: 2005).*
English translation of GB/T 50121-2005, Chinese Rating Standard of Sound Insulation in Buildings, translation performed by USPTO Scientific and Technical Information Center (STIC) on Feb. 24, 2025 (Year: 2005).*
Loverde, J. & Dong, W., "A dual-rating method for evaluating impact noise isolation of floor-ceiling assemblies", Journal of the Acoustical Society of America, Jan. 2017, Abstract only.
University of Rhode Island and Inner Space Center, "Discovery of Scound in the Sea", obtained from https://dosits.org/science/advanced-topics/how-does-sound-move-wave-propagation-and-huygens-principle/.
Kuczsmarski, M.A. and Johnston, J.C., "Acoustic Absorption in Porous Materials", NASA/TM 2011-216995, NASA Glenn Research Center, Cleveland, OH, Mar. 2011.

* cited by examiner

ACOUSTIC WAVE TRANSFORMATION AND ATTENUATION MEMBRANE

CROSS-REFERENCE TO RELATED APPLICATION

The present application claims the benefit of priority to U.S. Provisional Application Ser. No. 63/243,980, filed on Sep. 14, 2021, which is incorporated herein by reference in its entirety.

BACKGROUND

Field of Invention

The present invention relates generally to membranes, underlayments, and materials that are used for soundproofing building surfaces that are subjected to dynamic and or impact loads causing unwanted airborne noise and structure borne vibration. More specifically, aspects of the present invention relate to an improved method and apparatus that significantly reduces the transmission of unwanted sound and vibration energy generated by dynamic and/or impact loads that propagate through floors in multi-story buildings, where a wide variety of floor coverings, adhesives, subfloors, and ceilings may be used.

Discussion of the Background

Typical floor assemblies consist of a subfloor constructed out of concrete, wood, metal, or similar materials, onto which are installed non-resilient (hard) or resilient (soft) floor coverings. These floor coverings often consist of ceramic, porcelain, stone tiles, natural wood, engineered wood, vinyl, or carpeting tiles, planks, or sheets, and the like. The floor coverings may be attached to the subfloor if desired, using a floor covering adhesive such as butyl, mastic, glue, urethane, epoxy, double-sided tape, thin-set mortar, or similar adhesive to name a few.

Dynamic and or impact loads are often applied to the floor surface that generate acoustic energy, which passes through matter as acoustic waves that propagate through the floor assembly and are often converted into noise that can disturb occupants in rooms below the floor assembly and/or subfloor. Dynamic loads may include the movement of objects or furniture, rolling of wheels or casters, operation of machinery or appliances, or use of exercise equipment, such as treadmills or stationary bicycles, for example. Impact loads may include footfalls, jumping, the dropping of objects, or the bouncing of balls, for example. It is therefore desirable and often necessary to disrupt, block, or absorb these acoustic waves before they can propagate into and through the subfloor.

Underlayments are used in some floor assemblies to provide waterproofing, crack isolation, and/or soundproofing. These underlayments are typically comprised of sheets, rolls, membranes and or boards comprised of cork, rubber, vinyl, bitumen, foam, felt, and or like materials used alone or in combinations in a floor assembly. The underlayments, sometimes referred to as membranes and or materials are usually positioned on top of the subfloor or positioned between the subfloor and floor covering.

The underlayments are often adhered directly to the subfloor using an adhesive, which is typically called a membrane adhesive. This membrane adhesive may be factory applied as an integral part of the underlayment. Membranes, underlayments, and materials with factory applied adhesive are typically referred to as self-adhered or peel & stick underlayments, membrane, or materials. Alternatively, membrane adhesives can be applied in the field in one or more steps to either the underlayment or the subfloor, or to both. If desired, these underlayments may also be placed onto the subfloor without membrane adhesives so that they are allowed to "float" on the subfloor.

Typically, after the floor underlayment has been placed or adhered onto the subfloor using a membrane adhesive as desired, floor coverings are usually applied or installed on top of the underlayment. Non-resilient floor coverings, such as ceramic, porcelain, or stone tiles, to name a few examples, are typically adhered to the underlayment using an adhesive that is often called a floor covering adhesive. This floor covering adhesive can be any adhesive known for this purpose, but usually the floor covering adhesive is typically a thin-set mortar. Resilient floor coverings, such as interlocking wood, engineered wood, vinyl, or vinyl composition tiles, boards, planks, or carpet to name a few examples, may be adhered to the underlayment using a floor covering adhesive comprised of a glue, mastic, urethane, epoxy, tape, or other suitable adhesive. Alternatively, the floor covering may be placed onto the underlayment without using a floor covering adhesive if desired to essentially "float" the floor covering on top of the underlayment.

American Society for Testing and Materials (ASTM) E492-09, which is the ASTM Standard Test Method for Laboratory Measurement of Impact Sound Transmission Through Floor-Ceiling Assemblies Using the Tapping Machine, ASTM, (2016), measures the effectiveness of various floor assemblies as desired, using what is known in the industry as the "tapping test." This tapping test consists of a machine that repeatedly drops a series of weighted hammers onto the top of the desired floor assembly in what is known as the source room. Below the source room is a receiving room which may or may not have a ceiling, where noise from the tapping disturbances is measured with an array of microphones. The noise levels in the receiving room are then used to develop a single-value numerical rating, known as the Impact Insulation Class (IIC).

The IIC rating is a relative measure of how much impact noise passes through the floor/ceiling assembly being tested. Impact Insulation Class tests are not single component tests and instead are an evaluation that includes the uppermost surface of the floor assembly, which is often a floor covering material in the upper test unit, to the ceiling and or ceiling assembly as desired in the lower test unit. An integral part of a report for any of these sound tests is a detailed description of the floor/ceiling assembly used in the test.

Floor assemblies that are often tested by ASTM E492-09 include for example, only the subfloor, or the subfloor with a floor covering with or without the floor covering adhesive, or a subfloor with acoustical underlayment(s), with or without the membrane adhesive, or a subfloor with acoustical underlayment(s), with or without the membrane adhesive, with a floor covering with or without the floor covering adhesive as desired to name a few combinations.

ASTM E492-09 tests can also be performed with or without a ceiling installed beneath the subfloor, which may be comprised of gypsum, drywall, and or acoustical ceiling tiles and the like, with thermal and or acoustic insulation if desired. These ceilings may be attached to the subfloor rigidly, using nails, screws, adhesives or the like, or they may be attached to the subfloor through a resilient vibration absorbing material, such as rubber, foam, springs, or the like, or they may be suspended below the subfloor by wire, threaded rod, rope, strings, or the like.

Typically, the use of suspended ceilings beneath the subfloor when testing the floor assemblies by ASTM E492-09 enables higher IIC ratings than when using floor assemblies that only utilize the subfloor without a suspended ceiling. Adding a suspended ceiling to the home or office can be very expensive and adds additional labor and material costs. It would be desirable to have a floor system by itself, as defined in this patent, that reduces noise due to dynamic and or impact loads that meets and exceeds building code requirements without the added costs and labor associated with installing a suspended and or acoustical ceiling.

Traditionally, the IIC ratings from ASTM E492-09 are measured in the 100-3150 Hz frequency range, although more recently, IIC ratings have been divided into a low frequency rating (LIIC) in the 100-400 Hz frequency range and a high frequency rating (HIIC) in the 400-3150 Hz frequency range. See ASTM E3222, which is the Standard Classification for Determination of High-frequency Sound Ratings and is incorporated herein by reference in its entirety. This was determined to be necessary because the traditional wide frequency band single-value IIC ratings did not adequately represent frequencies that were most bothersome to building occupants nor did they properly differentiate among the various types of acoustical flooring underlayment products. That is, the traditional wide frequency band IIC ratings are overly dependent on the low frequency sound attenuating characteristics of acoustical flooring underlayments, for which they have very little affect. Even though audible and measurable differences could be found among different acoustical flooring underlayment products, there was very little difference in their wide frequency band numerical IIC rating numbers. Differences could only be seen in the high frequency range (400-3150 Hz).

Non-resilient floor coverings, such as ceramic, porcelain, or stone tiles to name a few, are used extensively throughout the world in buildings and homes. These hard surfaced floor coverings provide an aesthetically pleasing, durable, and smooth surface. Because of their easy maintenance and very long durability, hard surfaced floor coverings have the lowest lifetime cost of any flooring. Unfortunately, hard surfaced floor coverings are well known to cause excessive noise transmission through floor assemblies, regardless of whether the subfloor is concrete or wood.

Concrete subfloors are the prevalent floor structure for many multi-story buildings, such as apartments, condominiums, hotels, and offices, in many commercial and institutional buildings. The combination of hard surfaced floor coverings over concrete subfloors pose significant challenges for soundproofing.

SUMMARY

Aspects of the invention may overcome one or more of the problems by providing an underlayment that is easy to apply, is cost effective, and/or significantly reduces noise transmission between the floors of these buildings.

The IIC and HIIC ratings for a typical concrete subfloor are relatively low, ranging between 25 and 30 on average, depending on the thickness and dimensions of the concrete subfloor. Hard surfaced flooring materials (e.g., ceramic tiles) adhered directly to a concrete subfloor do not improve the IIC or HIIC ratings achieved by the concrete subfloor itself. Thus, a concrete subfloor finished with ceramic tiles or similar materials provide low IIC and HIIC rating values. The use of non-acoustical underlayments, such as those used for crack isolation or waterproofing, only modestly increase the IIC and HIIC ratings of a hard-surfaced floor covering installed on a concrete subfloor to about 35-45. Therefore, a noise reduction layer may be added to significantly reduce impact noise for this type of extensively used floor assembly.

Typically, the IIC and HIIC ratings are about the same when using conventional floor acoustical underlayments consisting of cork, rubber, vinyl, bitumen, foam, felt, or other energy absorbing material when tested alone or in floor assemblies. These IIC and HIIC ratings usually fall in the 45-52 range for concrete subfloors without suspended ceilings. Most building codes, such as the International Building Code, and homeowner associations require floors with a minimum IIC rating of 50, although IIC and HIIC ratings of 55 or greater are now desirable over concrete subfloors without suspended ceilings.

Longer wavelength sound and vibration, such as those associated with low frequencies, will be virtually unaffected by noise and vibration attenuation materials, devices, and treatments, such as dispersers, absorbers, dampers, and barriers. Because of the long acoustic wavelengths, only a small portion of the acoustic wave can be scattered, dispersed, absorbed, or damped by obstacles and materials placed in the path of the incident acoustic wave. The rest of these longer wavelength acoustic waves remain coherent or will diffract around the obstacles in a series of Huygens' wavelets. After encountering these obstacles, these wavelets may re-combine and propagate in the same direction as the incident long wavelength acoustic waves with little or no attenuation (i.e., similar amplitude to incident acoustic wave).

Shorter wavelength sound and vibration, such as those associated with high frequencies, interact with obstacles and materials placed in the path of the incident acoustic wave, and are more prone to scattering, dispersion, absorption, and damping than longer wavelength sound and vibration. These interactions cause the incident acoustic wave to be absorbed, as particle motion within the obstacles or materials placed in the path of the incident acoustic wave results in friction and damping that converts the acoustic wave into heat that is dissipated. This results in a reduction of amplitude of acoustic waves that may propagate through the subfloor and be converted into noise in the space below the floor assembly. Shorter wavelength sound and vibration is therefore more easily attenuated than longer wavelength sound and vibration.

When sound propagates through a medium, such as air, it exhibits a temporal frequency and a spatial frequency. The temporal frequency is commonly expressed in terms of radians per sec, cycles per second, or Hz. The spatial frequency is expressed in terms of wavelength or meters. In a given medium the wave speed is constant; therefore, by knowing the temporal frequency, it is possible to calculate the spatial frequency by the well-known formula:

$$\lambda = \frac{c}{f} \qquad \text{(Eq. 1)}$$

where $\lambda$ is the spatial frequency or wavelength, f is the temporal frequency, and c is the speed of sound in the medium. At sea level, the speed of sound in air is about 340 m/sec, therefore a 1000 Hz tone will have a wavelength of 0.34 m. In water, however, the speed of sound is about 1500 m/sec, so the same 1000 Hz tone will have a wavelength of 1.50 m.

Aspects of the invention may provide an acoustic wave transformation and attenuation (AWTA) sound proofing membrane including a waveform transformation matrix, which may use a waveform transformation matrix to manipulate and/or alter the spatial frequency (wavelength) of the acoustic wave propagating through the flooring assembly. Subsequently, the transformed acoustic waves may be attenuated with conventional acoustic absorption and vibration damping materials that are optimized to attenuate those acoustic wavelengths before they propagate through the flooring assembly.

Grube et al. in U.S. Pat. No. 8,590,670B1, issued on Nov. 26, 2013, disclose a floor soundproofing membrane that comprises a de-coupling layer together with a barrier layer and a viscoelastic constrained vibration damping layer. This soundproofing membrane is placed between the floor covering and the subfloor and is used to effectively de-couple or interrupt the flow of vibration energy from the floor covering to the subfloor. There are practical limits to this approach, however, as at lower frequencies, the acoustic wavelength becomes too long for the membrane to effectively attenuate it. Although this membrane demonstrated ASTM E492-09 IIC ratings of 50 (without a suspended ceiling) when incorporating this sound proofing membrane between a tile floor covering and a concrete subfloor, it does not meet the newly desired IIC or HIIC ratings of 55 or above.

Böttcher et al. in WO2020/007918A1, published Jan. 9, 2020, and Van Der Eem et al. in WO2021/018903A1, published Feb. 4, 2021, disclose a honeycomb composite structure used for sound attenuation of flooring assemblies. The approach used in these two patent applications involves the use of a screed (i.e., a thick layer of gypsum, mortar, or cement) which is allowed to "float" on top of the honeycomb composite structure. The screed and honeycomb structure are placed between the floor covering and the subfloor, which effectively reduces the resonant frequency of the floor. Sound and vibration attenuation is achieved as the lower frequency floor resonance reduces the vibration transmissibility of the floor at frequencies greater than the resonant frequency. There are practical limitations to this approach because it is not possible to significantly reduce the stiffness of the honeycomb structure (and thereby the floor resonant frequency) due to the fact that excessive floor bending may contribute to structural failure or cracking of the floor covering material, adhesive, or grout.

Aspects of the invention may provide a soundproofing assembly, membrane, and/or acoustical underlayment that is easy to apply, is cost effective, and/or that not only meets but exceeds IIC and HIIC ratings of 55 (without a suspended ceiling) that are desired by architects, building owners, home owner associations, and code bodies. This sound proofing may be used in a sound proofing assembly as an underlayment, and or membrane, and or material.

One aspect of the invention may provide an acoustic wave transformation and attenuation sound proofing membrane including an acoustic wave transformation layer, an acoustic absorption layer, and a constrained vibration damping layer. The constrained vibration damping layer may include a constraining face material and a viscoelastic vibration damping layer. The acoustic absorption layer may be in between the acoustic wave transformation layer and the constrained vibration damping layer.

In some aspects, the acoustic wave transformation layer may be adhered to the acoustic absorption layer. In some aspects, the constrained vibration damping layer may be adhered to the acoustic absorption layer.

In some aspects, the sound proofing membrane may meet all requirements of American National Standard Institute (ANSI) A118.10, ANSI A118.12, and ANSI A118.13 for waterproofing, crack isolation, and sound reduction membranes.

In some aspects, the acoustic wave transformation layer may include a top face sheet layer, a bottom face sheet layer, and an acoustic wave transformation matrix core layer. In some aspects, the top face sheet layer and the bottom face sheet layer may be adhered to the acoustic wave transformation matrix core layer so that the acoustic wave transformation matrix core layer is in between the top face sheet layer and the bottom face sheet layer.

In some aspects, the acoustic wave transformation matrix core layer may include a lightweight material. In some aspects, the lightweight material may have a mass density equal to or less than 5000 $kg/m^3$.

In some aspects, the acoustic wave transformation matrix core layer may include cells, chambers, and/or compartments, and the cells, chambers, and/or compartments may include one or more regular or irregular patterns, arrangements, and/or configurations that are arranged randomly and/or orderly and/or both. In some aspects, the cells, chambers, and/or compartments of the wave transformation matrix core layer may have one or more geometric configurations. In some aspects, the cells, chambers, and/or compartments of the acoustic wave transformation matrix core layer may contain gas or gases. In some aspects, the gas or gases contained in the cells, chambers, and/or compartments of the acoustic wave transformation matrix core layer may include atmospheric air and/or one or more of nitrogen, carbon dioxide, and helium. In some aspects, the gas or gases contained in the cells, chambers, and/or compartments of the acoustic wave transformation matrix core layer may have a mass density of less than 2 $kg/m^3$.

In some aspects, the cells, chambers, and/or compartments of the acoustic wave transformation matrix core layer may contain lightweight materials. In some aspects, the lightweight materials contained in the cells, chambers, and/or compartments of the wave transformation matrix core layer may include beads, spheres, particles, grains, expanded glass, hollow spheres, Styrofoam, lightweight volcanic pumice, perlite, gas-filled microspheres, and/or vulcanized rubber. In some aspects, the lightweight materials contained in the cells, chambers, and or compartments of the acoustic wave transformation matrix core layer may have a mass density of less than 1000 $kg/m^3$.

In some aspects, the cells, chambers, and/or compartments of the acoustic wave transformation matrix core layer may create multiple obstructions and/or surfaces that scatter, reflect, diffract, and diffuse sound and vibration from acoustic waves generated by dynamic and/or impact loads on the floor covering. In some aspects, the acoustic wave transformation matrix core layer may be capable of increasing a spatial frequency of the incident acoustic wave by a factor of ten or more.

In some aspects, the top face sheet layer and the bottom face sheet layer may be configured to protect and reduce unwanted contamination of the acoustic wave transformation matrix core layer. In some aspects, the top face sheet layer and/or the bottom face sheet layer may contain cells, chambers, and/or compartments that form a part of or form the entire wave transformation matrix core layer.

In some aspects, the acoustic absorption layer may include one or more layers that include materials including woven or non-woven fabrics, felt, foam, rubber, paper, natural wool, mineral wool, and/or fiberglass. In some aspects, the acoustic absorption layer may include acoustic metamaterials that are capable of absorbing lower frequency acoustic waves. In some aspects, the acoustic absorption layer may be configured to attenuate the transformed acoustic waves from the acoustic wave transformation layer.

In some aspects, the constraining face material layer may be constructed from materials including metal, plastic, foil, and/or film.

In some aspects, the viscoelastic vibration damping layer may be a pressure sensitive adhesive. In some aspects, the viscoelastic vibration damping layer include bitumen, polymer modified bitumen, vulcanized rubber, urethane, cork, natural or synthetic rubber, and/or vinyl. In some aspects, the viscoelastic vibration damping layer may be adhered to the constraining face material layer. In some aspects, the viscoelastic vibration damping layer may have a thickness between 0.1 to 12 mm.

In some aspects, the sound proofing membrane may be configured to, relative to a bare concrete subfloor, reduce the wavelengths of acoustic waves propagating through a concrete subfloor by at least a factor of 10 across the audible frequency range when used with a non-resilient floor covering and without a suspended ceiling used in the room below. In some aspects, the sound proofing membrane may be capable of increasing the Impact Insulation Class (IIC) rating per American Society for Testing and Materials (ASTM) E3222 of a floor assembly to a minimum of 50 when used with a non-resilient floor covering on a concrete subfloor without a suspended ceiling used in a room below. In some aspects, the sound proofing membrane may be capable of increasing the Impact Insulation Class (IIC) rating per American Society for Testing and Materials (ASTM) E3222 of a floor assembly to a minimum of 60 when used with a non-resilient floor covering on a concrete subfloor without a suspended ceiling used in the room below.

Another aspect of the invention may provide a method for creating an acoustic wave transformation and attenuation sound proofing membrane. The method include forming an acoustic wave transformation layer. The method include bonding an acoustic absorption layer to the acoustic wave transformation layer. The method include bonding the acoustic absorption layer to a constraining face material. The method include bonding a viscoelastic vibration damping layer to the constraining face material.

In some aspects, forming the acoustic wave transformation layer may include bonding a top face sheet layer and a bottom face sheet layer to a wave transformation matrix core layer.

In some aspects, one or more of bonding the acoustic absorption layer to the acoustic wave transformation layer, bonding the acoustic absorption layer to the constraining face material, and bonding the viscoelastic vibration damping layer to the constraining face material may be performed during a manufacturing process. In some aspects, one or more of bonding the acoustic absorption layer to the acoustic wave transformation layer and bonding the acoustic absorption layer to the constraining face material may be performed during field installation.

In some aspects, the acoustic wave transformation layer may have a thickness of 2.50 to 27 mm, the acoustic absorption layer may have a thickness of 1 to 12 mm, and the constrained viscoelastic damping layer may have a thickness of 0.5 to 12 mm.

In some aspects, the method may further include using the acoustic wave transformation and attenuation sound barrier membrane between a floor covering and a subfloor for purposes of attenuating impact and or dynamic noise that may pass from the surface of the floor covering through the subfloor into the room below.

In some aspects, the method may further include bonding the acoustic wave transformation and attenuation sound proofing membrane to a subfloor with an adhesive. In some aspects, the acoustic wave transformation and attenuation sound proofing membrane may be not bonded to a subfloor. In some aspects, the method may further include bonding a floor covering to the acoustic wave transformation and attenuation sound proofing membrane with an adhesive. In some aspects, a floor covering may be not bonded to the acoustic wave transformation and attenuation sound proofing membrane.

In some aspects, the acoustic absorption layer may be bonded to the constraining face material before the viscoelastic vibration damping layer is bonded to the constraining face material. In some aspects, the acoustic absorption layer may be bonded to the constraining face material after the viscoelastic vibration damping layer is bonded to the constraining face material.

Further variations encompassed within the systems and methods are described in the detailed description of the invention below.

BRIEF DESCRIPTION OF THE DRAWINGS

The accompanying drawings, which are incorporated herein and form part of the specification, illustrate various, non-limiting embodiments of the present invention. In the drawings, like reference numbers indicate identical or functionally similar elements.

DRAWING NUMBERS

1a Floor Assembly without Acoustic Underlayment
1b Floor Assembly with Conventional Non-Acoustic Underlayment
1c Floor Assembly with Conventional Acoustic Underlayment
1d Floor Assembly with Acoustic Wave Transformation and Attenuation Membrane
2 Subfloor
3 Floor Covering
4 Floor Covering Adhesive
5 Dynamic and or Impact Load
6 Acoustic Waves
7 Noise
8a Conventional Non-Acoustical Underlayment
8b Conventional Acoustical Underlayment 9 Membrane Adhesive
10 Acoustic Wave Transformation and Attenuation Membrane
11 Acoustic Wave Transformation Layer
12 Acoustic Absorption Layer
13 Constrained Vibration Damping Layer
14 Acoustic Wave Transformation Top Face Sheet Layer
15 Acoustic Wave Transformation Matrix Core Layer
16 Acoustic Wave Transformation Bottom Face Sheet Layer
17 Constraining Face Material
18 Viscoelastic Vibration Damping Layer
19 Attenuated Acoustic Waves
20 Acoustic Spectrum for Bare Subfloor
21 Acoustic Spectrum for Conventional Underlayment
22 Acoustic Spectrum for Conventional Acoustic Underlayment
23 Acoustic Spectrum for Acoustic Wave Transformation and Attenuation Membrane

DETAILED DESCRIPTION

Figure 1:
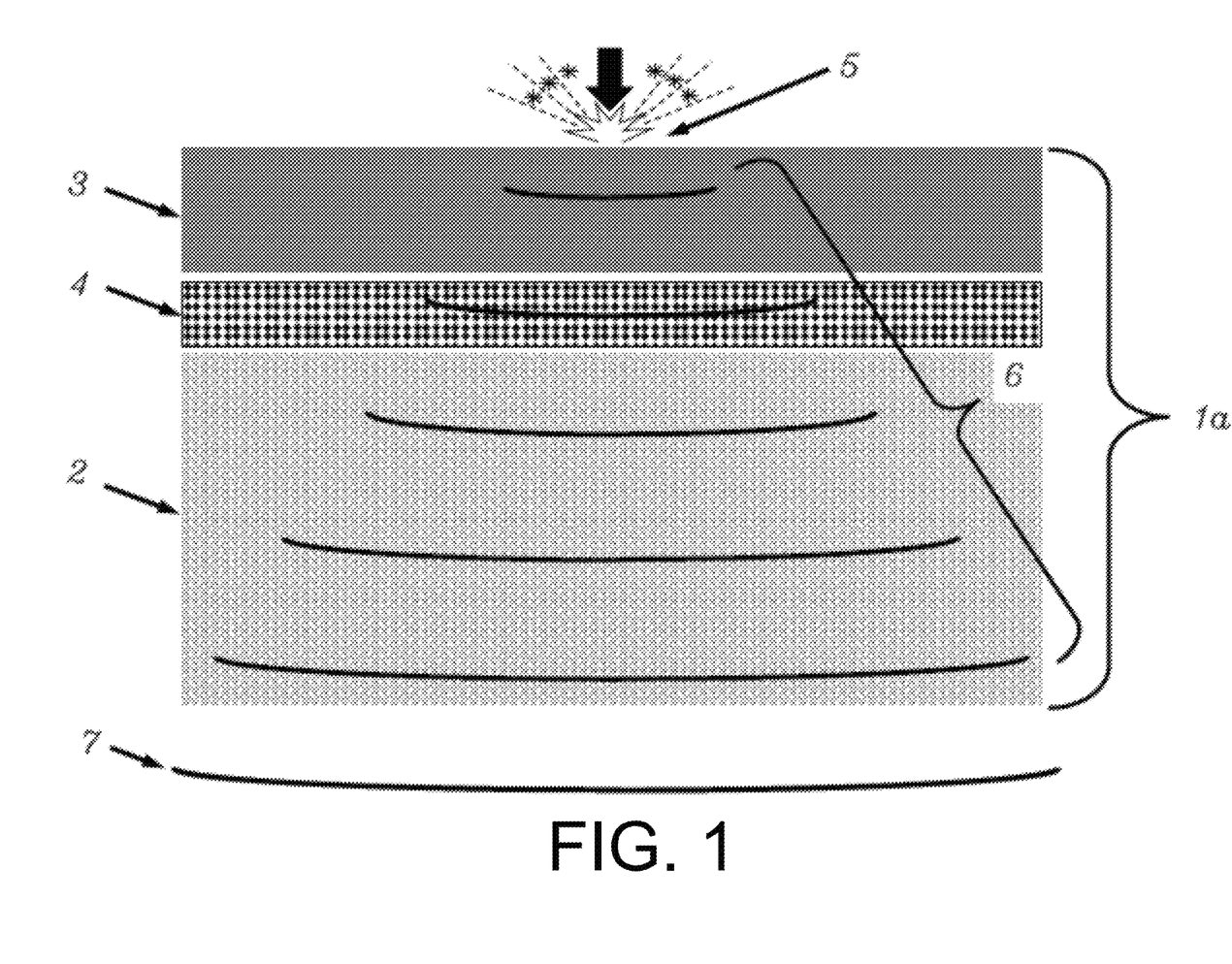
FIG. 1 is a cross-sectional view of a conventional floor assembly showing propagating acoustic waves without an acoustic underlayment.
Figure 2:
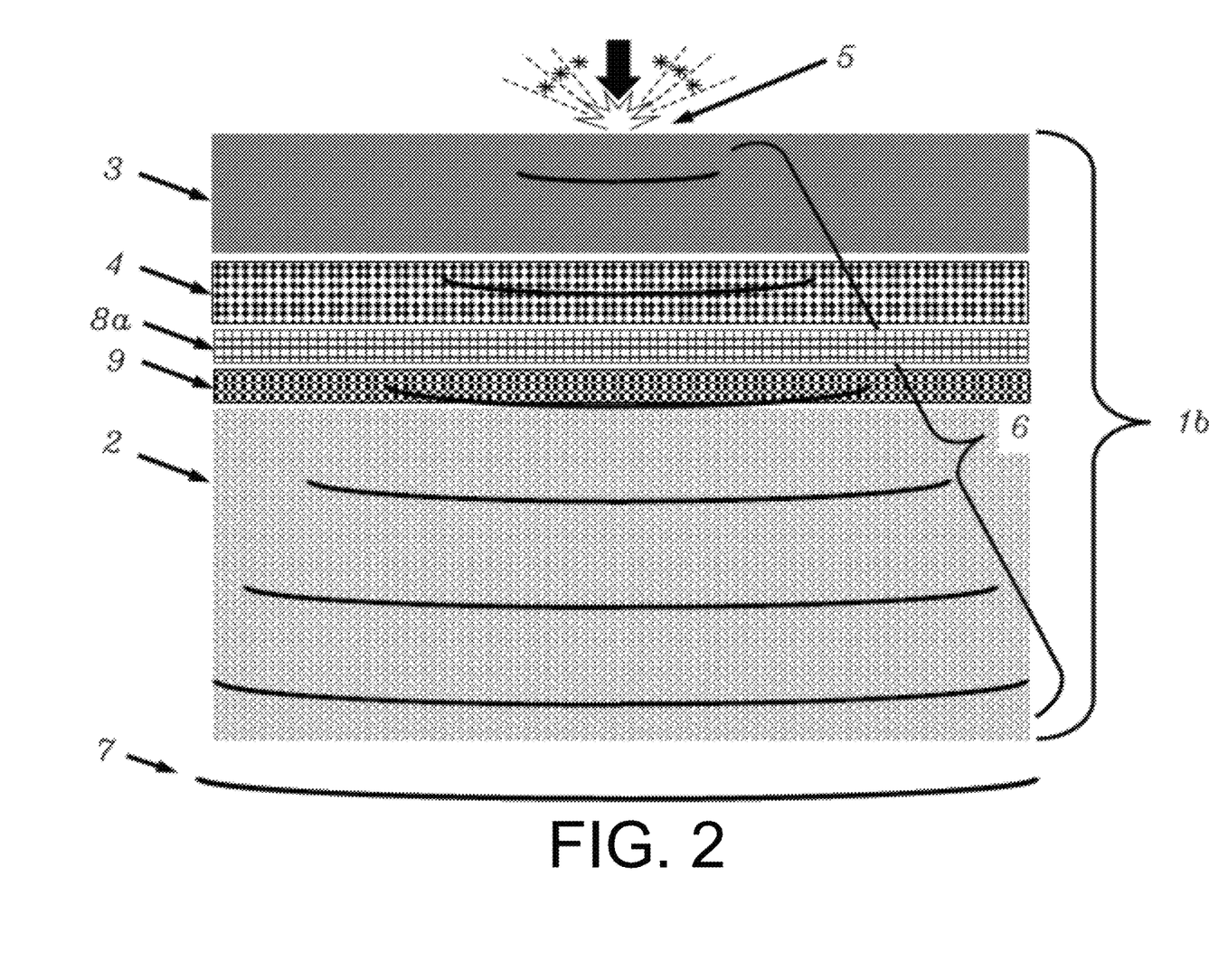
FIG. 2 is a cross-sectional view of a conventional floor assembly showing propagating acoustic waves using a conventional non-acoustic underlayment.
Figure 3:
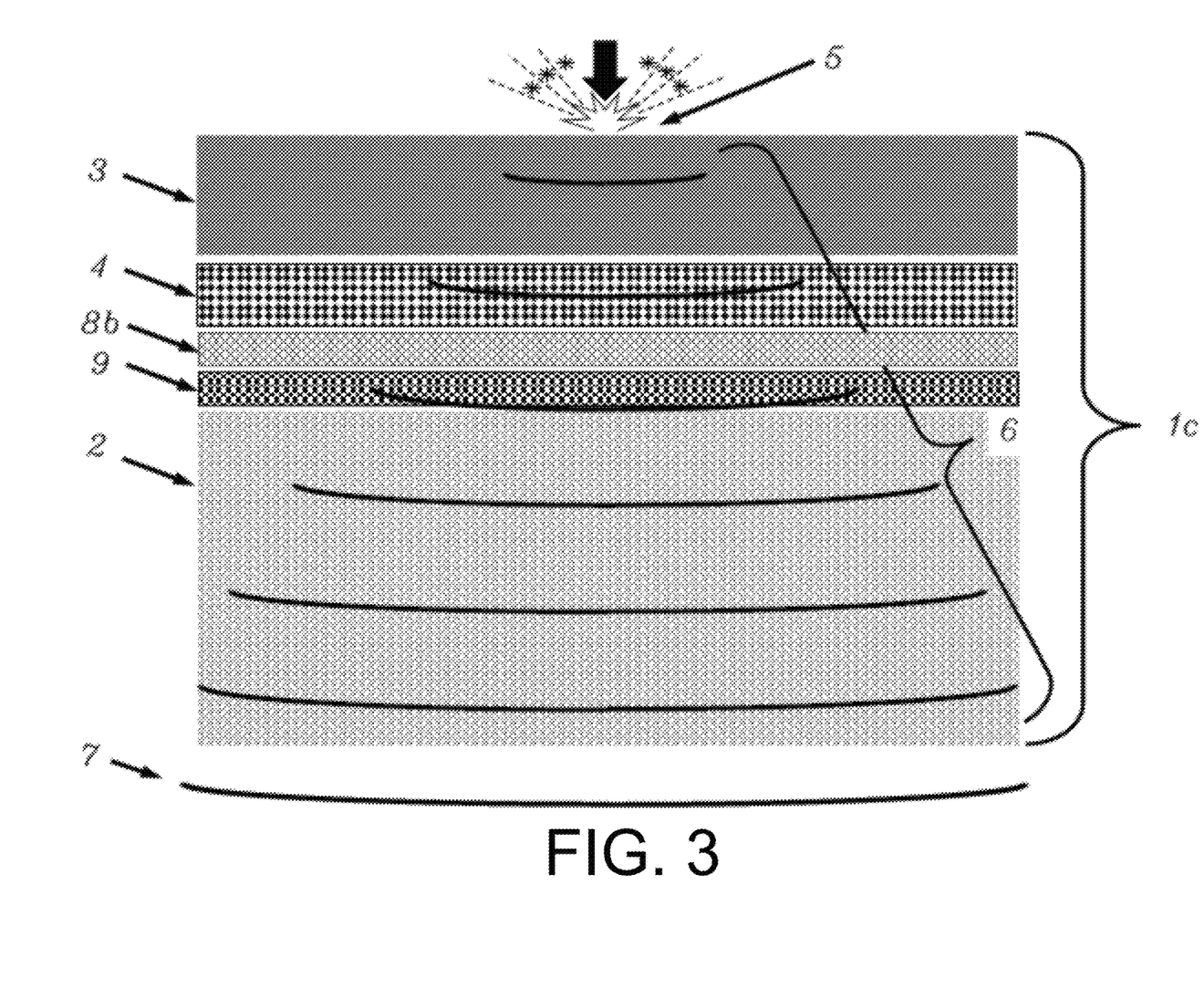
FIG. 3 is a cross-sectional view of a conventional floor assembly showing propagating acoustic waves using a conventional acoustic underlayment.

FIG. 1 depicts a conventional floor assembly 1a that comprises a floor covering 3 and an optional floor covering adhesive 4 over a subfloor 2 with a dynamic and/or impact load 5 generating acoustic waves 6 and noise 7 passing through the floor assembly 1a into a room below. FIG. 2 depicts a floor assembly 1b that comprises a floor covering 3, an optional floor covering adhesive 4, a conventional non-acoustical underlayment 8a, and an optional membrane adhesive 9 over a subfloor 2 with a dynamic and/or impact load 5 generating acoustical waves 6 and noise 7 passing through the floor assembly 1b into a room below. FIG. 3 depicts a floor assembly 1c that comprises floor covering 3, an optional floor covering adhesive 4, a conventional acoustical underlayment 8b, and an optional membrane adhesive 9 over a subfloor 2 with a dynamic and/or impact load 5 generating acoustic waves 6 and noise 7 passing through the floor assembly 1c into a room below.

Figure 5:
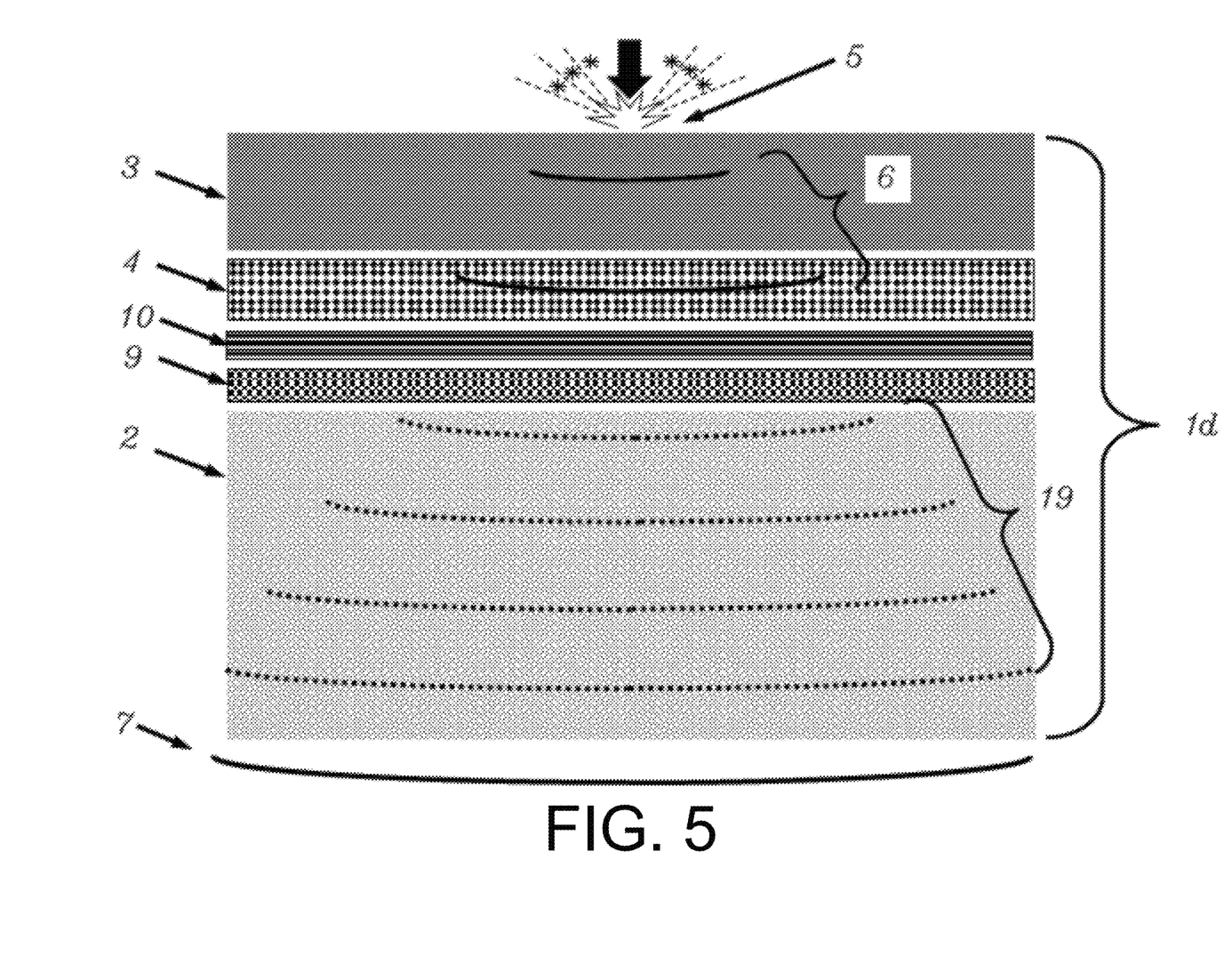
FIG. 5 is a cross-sectional view of a floor assembly using an AWTA sound proofing membrane according to some aspects and showing propagating acoustic waves being attenuated.

FIG. 5 depicts a floor assembly 1d according to some aspects of the present invention. In some aspects, the floor assembly 1d may include a floor covering 3, an optional floor covering adhesive 4, an acoustic wave transformation and attenuation (AWTA) sound proofing membrane 10, and an optional membrane adhesive 9 over a subfloor 2 with a dynamic and/or impact load 5 generating acoustic waves 6, attenuated acoustic waves 19, and reduced noise 7 that passes through the floor assembly 1d into a room below.

In some aspects, the reduction in unwanted noise 7 that passes through the floor assembly 1d, as shown in FIG. 5, may be accomplished using the AWTA sound proofing membrane 10. In some aspects, the AWTA sound proofing membrane 10 may replace the conventional non-acoustical underlayment 8a in the floor assembly 1b shown in FIG. 2 and/or the conventional acoustical underlayment 8b in the floor assembly 1c shown in FIG. 3.

As shown in FIG. 5, some aspects of the present invention relate to a method and apparatus for reducing (e.g., significantly reducing) the transmission of unwanted noise 7 passing through a subfloor 2 and generated by dynamic and/or impact loads 5. In some aspects, an acoustic wave transformation and attenuation (AWTA) sound proofing membrane 10 may be used to transform acoustic waves 6 into attenuated acoustic waves 19 through a floor assembly 1d (e.g., in multi-story buildings, where a wide variety of floor coverings, adhesives, and subfloors may be used).

Figure 6:
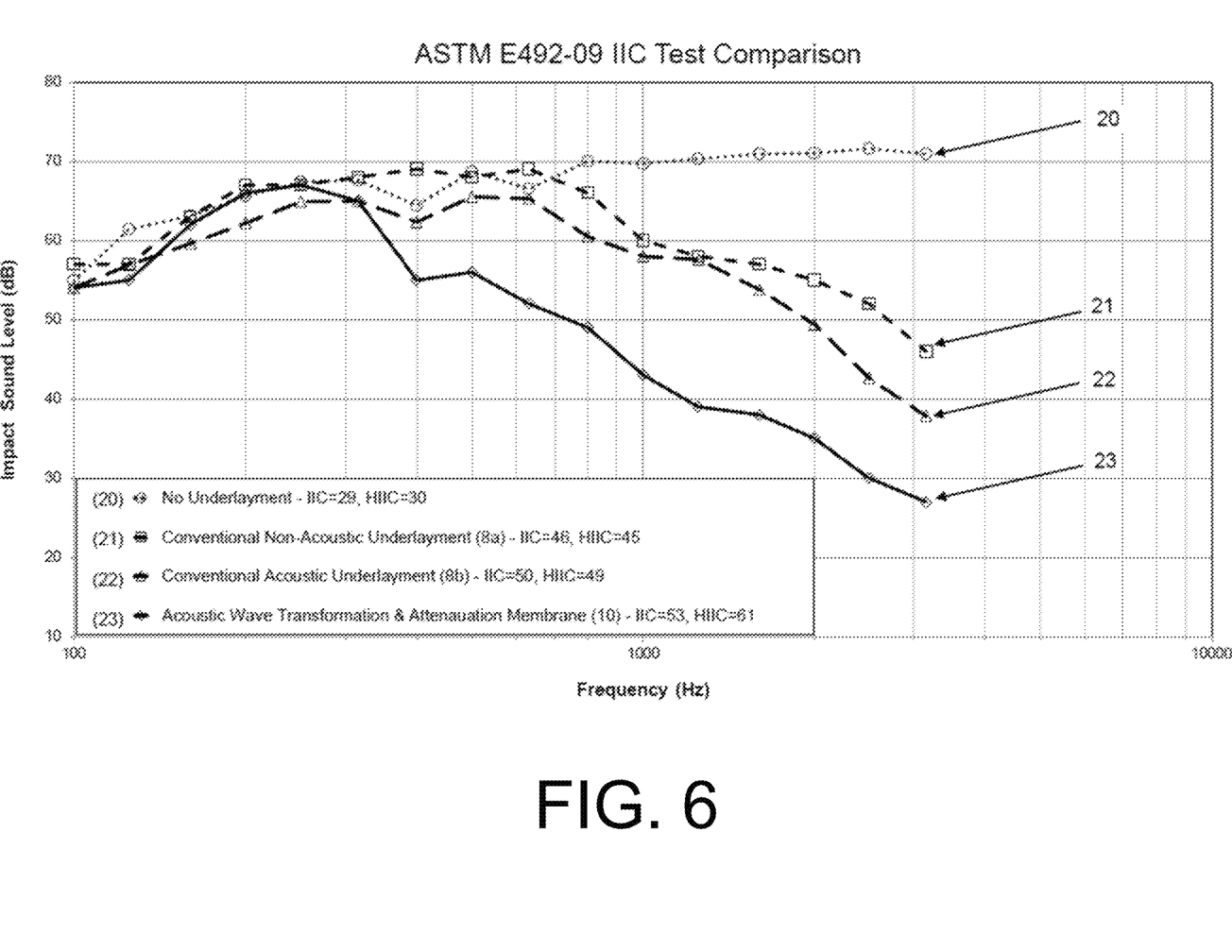
FIG. 6 shows ASTM E492-09 impact insulation test results.

The ability of aspects of the AWTA Membrane 10 to reduce noise 7 has been demonstrated through ASTM E492-09 impact acoustical tests to reduce noise 7 below a floor assembly and, as shown in FIG. 6, achieve higher IIC and higher HIIC ratings compared to the conventional non-acoustical underlayment 8a shown in FIG. 2 and the conventional acoustical underlayments 8b shown in FIG. 3 when tested in similar floor assemblies using the same ASTM standard. That is, as shown in FIG. 6, some aspects of the present invention may produce higher IIC and HIIC ratings than those achieved using (i) a conventional floor assembly 1a without a conventional non-acoustical or acoustical underlayment as shown in FIG. 1, (ii) a floor assembly 1b with a conventional non-acoustical underlayment 8a as shown in FIG. 2, and (iii) a floor assembly 1c with a conventional acoustical underlayment 8b as shown in FIG. 3.

Figure 4:
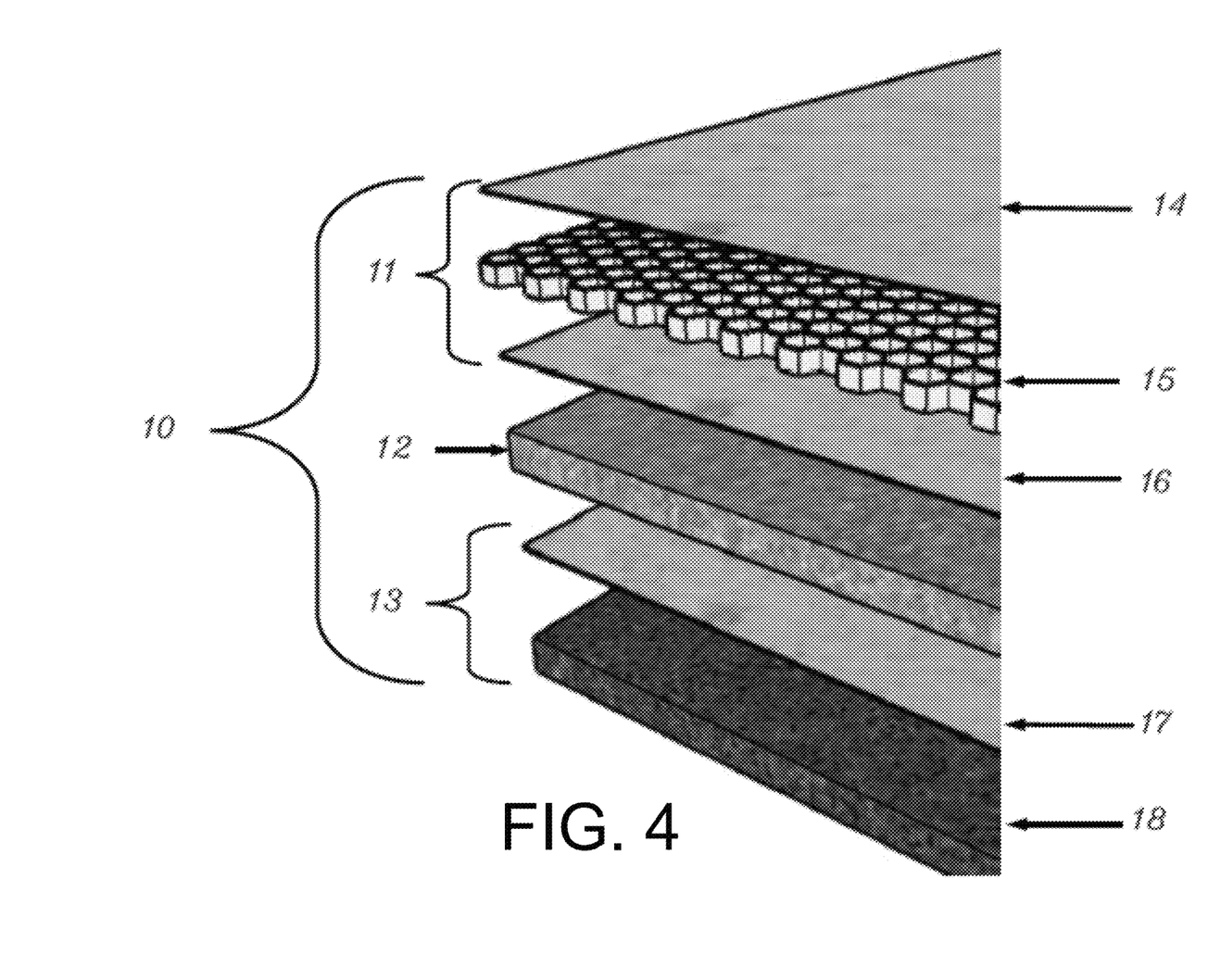
FIG. 4 is a cross-sectional view of an acoustic wave transformation and attenuation (AWTA) sound proofing membrane according to some aspects.

In some aspects, the acoustic wave transformation and attenuation (AWTA) sound proofing membrane 10 shown in FIG. 5 may reduce unwanted noise 7 passing through the subfloor 2 and into the room below. In some aspects, a dynamic and/or impact load 5 generated on the surface of floor covering 3 may create acoustic waves 6 that pass through the floor covering 3, the optional floor covering adhesive 4, and the AWTA sound proofing membrane 10. In some aspects, as shown in FIG. 4, the AWTA sound proofing membrane 10 may include an acoustic wave transformation layer 11, an acoustic absorption layer 12, and a constrained vibration damping layer 13. In some aspects, the acoustic wave transformation layer 11 may include an acoustic wave transformation matrix core layer 15. In some aspects, the acoustic wave transformation matrix core layer 15 may convert a majority of the longer wavelength acoustic waves associated with the acoustic waves 6 into shorter wavelength acoustic waves that are more easily absorbed and damped by the acoustic absorption layer 12 and constrained vibration damping layer 13 before the acoustic waves pass through the optional membrane adhesive 9 and/or the subfloor 2 and into the room below. FIG. 5 depicts these shorter acoustic waves as attenuated acoustic waves 19.

Conventional non-acoustical underlayments 8a and conventional acoustical underlayments 8b cannot sufficiently convert, transform, and/or reduce the longer wavelength acoustic waves 6 generated by dynamic and/or impact loads 5 and often do not contain additional layers of materials that can absorb and/or damp floor noise and vibration. Conventional non-acoustical underlayments 8a and conventional acoustical underlayments 8b will therefore transmit a significant amount of acoustic wave energy 6 through the subfloor 2, resulting in significant noise 7 that can be heard in spaces below the floor assembly 1b or 1c, as shown in FIGS. 2 and 3. Aspects of the multi-layer AWTA sound proofing membrane 10 may address the inherent limitations of conventional non-acoustical underlayments 8a and conventional acoustical underlayments 8b.

FIG. 4 depicts a cross-sectional view (not to scale) of the acoustic wave transformation and attenuation (AWTA) sound proofing membrane 10 according to some aspects. In some aspects, as shown in FIG. 4, the AWTA sound proofing membrane 10 may include at least one acoustic wave transformation layer 11, at least one acoustic absorption layer 12, and/or at least one constrained vibration damping layer 13. Although, in some aspects, the AWTA sound proofing membrane 10 may incorporate the plurality of layers (e.g., layers 11, 12, and/or 13) into a single underlayment, membrane, and or material, this is not required. In some alternative aspects, the acoustic wave transformation layer(s) 11, acoustic absorption layer(s) 12, and/or constrained vibration damping layer(s) 13 may be used separately and independently of one another or in combinations thereof to form and achieve a soundproofing and or acoustical underlayment, membrane or material.

In some aspects, the acoustic wave transformation layer 11 of the AWTA sound proofing membrane 10 may include at least one top face sheet layer 14, at least one acoustic wave transformation matrix core layer 15, and/or at least one bottom face sheet layer 16. In some aspects, both the top face sheet layer 14 and the bottom face sheet layer 16 may be bonded to the acoustic wave transformation matrix core layer 15. In some aspects, bonding the top face sheet layer 14 and the bottom face sheet layer 16 to the acoustic wave transformation matrix core layer 15 may prevent contamination from dirt, sand, adhesives, and so forth of the Acoustic Wave Transformation Layer Matrix Core 15.

In some aspects, the top face sheet layer 14 and bottom face sheet layer 16 may contain and/or be comprised of woven or non-woven fabric(s), felt, plastic, Mylar, film, foil, or similar materials used alone or in various combinations that provide a barrier and or barrier layers to prevent contamination or intrusion from the floor covering adhesive 4 and/or from the acoustic absorption layer 12, and/or other foreign materials (e.g., dirt, dust, sand, water, or the like), which may contaminate, distort, and/or fill or partially fill the cells of the acoustic wave transformation matrix core layer 15 and decrease the effectiveness and/or efficiency of the acoustic wave transformation matrix core layer 15. For example, if some aspects in which the acoustic wave transformation layer matrix core 15 may include one or more hollow cells, chambers, and/or compartments, and the top face sheet layer 14 and the bottom face sheet layer 16 may prevent contaminants (e.g., mortar) from falling into the hollow cells, which may reduce the effectiveness of the acoustic wave transformation layer 11.

In some aspects, the top face sheet layer 14 and the bottom face sheet layer 16 may be adhered to the acoustic wave transformation layer matrix core 15 to make up the total thickness of acoustic wave transformation layer 11. In some aspects, the top face sheet layer 14 and the bottom face sheet layer 16 may be made of the same constituent materials or different constituent materials.

In some alternative aspects, the top face sheet layer 14 of the acoustic wave transformation layer may be adhered to acoustic wave transformation matrix core layer 15, and the acoustic wave transformation layer matrix core layer 15 may be bonded directly to acoustic absorption layer 12 such that the bottom face sheet layer 16 is not included in the AWTA sound proofing membrane 10. In these aspects, the acoustic absorption layer 12 may act as the barrier layer to prevent foreign materials, such as dirt, dust, sand, water, or the like, which may contaminate, distort, damage and or fill or partially fill the cells of acoustic wave transformation matrix core layer 15 and decrease the effectiveness and or efficiency of acoustic wave transformation matrix core layer 15.

In some aspects, the acoustic wave transformation matrix core layer 15 may be comprised of lightweight material(s), such as plastic, paper, metal foil, foam, fiberglass, or carbon composites, or similar materials. In some aspects, the materials that make up the acoustic wave transformation matrix core layer 15 may have a mass density equal to or less than 5000 kg/m3, a preferred mass density equal to or less than 3000 kg/m3, an even more preferred mass density equal to or less than 1500 kg/m3, or a most preferred mass density equal to or less than 1000 kg/m3. In some aspects, the lightweight materials may increase the spatial frequency of the incident acoustic wave 6 (e.g., by a factor of 10 or more).

In some aspects, the acoustic wave transformation matrix core layer 15 of the acoustic wave transformation layer 11 may contain a plurality of cells, chambers, and/or compartments, which may include one or more regular or irregular patterns, arrangements, and/or configurations. In some aspects, these configurations maybe random in nature and/or be orderly in nature and/or may be of different geometric configurations. For example, as shown in FIG. 4, the plurality of cells of the acoustic wave transformation matrix core layer 15 may be are configured as a series of orderly honeycomb chambers.

In some alternative aspects, the acoustic wave transformation matrix core 15 may incorporate cells that have different geometric configurations or combinations thereof, which include but are not limited to corrugations, cylinders, squares, cubes, pyramids, spheres, hemispheres, posts, entangled wire, or the like in order to created chambers or spaces within acoustic wave transformation layer 11. In some aspects, these chambers and spaces may be a part of the top face sheet layer 14 and/or the bottom face sheet layer 16 so that at least one of these face sheet layers contributes to or replaces the acoustic wave transformation layer 11.

In some aspects, the various geometries, patterns, and/or designs for the acoustic wave transformation matrix core 15 and the acoustic wave transformation layer 11 may be designed to create multiple obstructions and/or surfaces that scatter, reflect, diffract, and diffuse sound and vibration from acoustic waves 6 generated by dynamic and/or impact loads 5 on the floor covering 3 such that the acoustic waves 6 are transformed in the acoustic wave transformation matrix core layer 15 into shorter wavelength acoustic waves that are more easily absorbed and damped by the acoustic absorption layer 12 and constrained vibration damping layer 13, as shown in FIG. 5 for example.

In some aspects, the cells and/or spaces that are formed when using these geometries, patterns, and/or designs that make up the acoustic wave transformation matrix core layer 15 may contain atmospheric air and may additionally or alternatively contain other gasses. For example, in some aspects, gases such as, nitrogen, carbon dioxide, or helium, or the like, to name a few may be used. In some aspects, these cells and/or spaces may contain lightweight materials (with or without the air or gases) such as beads, spheres, particles, grains, expanded glass, hollow spheres, Styrofoam, lightweight volcanic pumice, perlite, gas-filled microspheres, vulcanized rubber, or like materials to name a few examples.

In some aspects, the mass density of the gases contained in the cells and/or spaces of the acoustic wave transformation matrix core layer 15 may be less than 2 kg/m$^3$. In some aspects, the mass density of the gases contained in the cells and/or spaces of the acoustic wave transformation matrix core layer 15 may be less than 1.2 kg/m$^3$. In some aspects, the mass density of the solids contained in the cells and/or spaces of the acoustic wave transformation matrix core layer 15 may be less than 1000 kg/m3, less than 400 kg/m3, or less than 240 kg/m3. In some aspects, the gases or materials contained in the cells may be selected based on their ability to change, transform, and/or shorten the wavelengths of the acoustic waves 6 in several frequency bands generated by dynamic and/or impact loads 5 as they pass through the acoustic wave transformation layer 11.

In some aspects, as shown in FIG. 4, the constrained vibration damping layer 13 may include a constraining face material 17 and a viscoelastic vibration damping layer 18. In some aspects, as shown in FIG. 4, the constraining face material 17 may be between the acoustic absorption layer 12 and the vibration damping layer 18. In some aspects, the constraining face material 17 may be constructed from materials such as metal, plastic, foil, film, and the like to name a few used alone or in combinations. In some aspects, the constraining face material 17 may prevent intrusion of material(s) of the viscoelastic vibration damping layer 18 into the acoustic absorption layer 12 and/or constrain the viscoelastic vibration damping layer 18 in a manner that induces shear mode deformations of the viscoelastic vibration damping layer 18 when subjected to vibration bending stresses.

In some aspects, the viscoelastic vibration vamping layer 18 may be comprised of one or a plurality of viscoelastic damping materials such as bitumen, polymer modified bitumen, urethane, cork, natural or synthetic rubber, vinyl, and/or similar materials to name a few, used alone or in combination. In some aspects, the viscoelastic damping materials may be capable of damping structural vibrations, acoustic energy and/or acoustic waves 6 before they enter the subfloor 2.

In some aspects, the layers of the AWTA sound proofing membrane may have thicknesses as summarized in Table 1 below.

TABLE 1

AWTA Membrane Layer Thicknesses

| | Layer Thickness (mm) | | | | | |
|---|---|---|---|---|---|---|
| | Preferred | | More Preferred | | Most Preferred | |
| Material | Minimum | Maximum | Minimum | Maximum | Minimum | Maximum |
| Acoustic Wave Transformation Top Face Sheet Layer (14) | 0.25 | 2 | 0.25 | 1 | 0.25 | 0.5 |
| Acoustic Wave Transformation Matrix Core Layer (15) | 2 | 23 | 2 | 11 | 2 | 5.5 |
| Acoustic Wave Transformation Bottom Face Sheet Layer (16) | 0.25 | 2 | 0.25 | 1 | 0.25 | 0.5 |
| Acoustic Absorption Layer (12) | 1 | 12 | 2 | 9 | 3 | 6 |
| Constraining Face Material (17) | 0.01 | 1 | 0.01 | 0.5 | 0.01 | 0.1 |
| Viscoelastic Vibration Damping Layer (18) | 0.1 | 12 | 0.1 | 6 | 0.1 | 3 |

The ASTM E492-09 impact test encompasses the acoustical frequency range from 100-3150 Hz. Table 2 below shows the calculated acoustic wavelengths for a bare conventional subfloor 2 made from concrete, a conventional acoustical underlayment 8b made of polymer modified bitumen, and the acoustic wave transformation and attenuation sound proofing membrane 10 according to some aspects at 100, 400, and 3150 Hz that could be generated during the ASTM E492-09 impact test. In Table 2, the calculated wavelength reduction factor is shown in comparison to the acoustic wavelength calculated in the bare concrete Subfloor 2.

TABLE 2

Reduction in Wavelength

| | Acoustic Wavelength (meters) | | | Reduction |
|---|---|---|---|---|
| Material | 100 Hz | 400 Hz | 3150 Hz | Factor |
| Bare Concrete Subfloor (2) | 37.0 | 9.3 | 1.2 | — |
| Conventional Polymer Modified Bitumen Acoustic Floor Underlayment (8b) | 25.0 | 6.3 | 0.8 | 1.5 |
| Acoustic Wave Transformation and Attenuation Membrane (10) | 3.4 | 0.9 | 0.1 | 10.8 |

As seen in Table 2, a conventional acoustical underlayment made of polymer modified bitumen can reduce the wavelength of an acoustic wave passing through concrete by a factor of 1.5. Unfortunately, this degree of reduction is minimal because the wavelength at the high frequency waveband of 3150 Hz is 0.8 meters long, which would be difficult to attenuate with acoustic absorption and damping materials of reasonable thickness (e.g., less than 50 mm). Furthermore, the flooring assembly 1c including this conventional acoustical underlayment 8b, as seen in FIG. 3, does not include a subsequent acoustic absorption or vibration damping layer to attenuate noise and vibration. The lack of an acoustical absorption and or vibration damping layer allows large amounts of acoustical energy to pass through the floor assembly 1c in FIG. 3 with the conventional acoustical underlayment 8b, which is made of a single layer of polymer modified bitumen in this example, relatively unimpeded, with a minimal amount of attenuation.

Table 2 shows that the floor assembly of FIG. 5 including the acoustic wave transformation layer 11 can reduce the acoustic wavelength by a factor of almost eleven when compared to concrete at 3150 Hz, which is practically seven times more effective than a conventional acoustic underlayment 8b made of a single layer of polymer modified bitumen.

In some aspects, the resulting shorter wavelength acoustical waves 6 caused by acoustic wave transformation layer 11 may allow the acoustic waves to be spread over a wider area. In some aspects, the lower acoustic wave energy per unit area coupled with the shorter acoustic wavelengths may allow the acoustic energy to be more easily absorbed and dissipated by one or a plurality of subsequent acoustic absorption layer(s) 12 and constrained vibration damping layer(s) 13, which may result in attenuated (e.g., lower amplitude) acoustic waves 19 that may be transmitted through the subfloor 2, as seen in FIG. 5. In some aspects, this may be especially true in the higher frequency wavebands between 400-3150 Hz, which comprise the HIIC rating.

In some aspects, as shown in FIG. 4, the acoustic absorption layer 12 may contain one or a plurality of sub layers of conventional acoustic absorption materials, such as woven or non-woven fabrics, felt, foam, rubber, paper, natural wool, mineral wool, fiberglass, or similar materials. In some aspects, acoustic absorption may be accomplished when acoustic waves 6, which have been transformed by the acoustic wave transformation layer 11, induce particle motion within the acoustic absorption layer 12 that results in friction and damping that converts the acoustical energy into heat, which is dissipated. In some aspects, the resulting loss of acoustical energy may reduce the amplitude of acoustic waves 6 that may propagate into constrained vibration damping layer 13 and eventually into the subfloor 2.

In some alternative aspects, the acoustical absorption layer 12 may include acoustic metamaterials that are capable of absorbing lower frequency acoustical waves than conventional sound absorption materials. In some aspects, the metamaterials may consist of a multitude of individual elements so that each of these cells or elements have a size that is much smaller than the wavelength that it interacts with. In some aspects, these metamaterial cells may be microscopically built from conventional materials such as metals, plastics, and or minerals to name a few, or non-conventional materials, such as carbon nanotubes, graphene, or alumina, for example.

In some aspects, bending stresses that are induced by dynamic and or impact load(s) 5 on the floor assembly 1d shown in FIG. 5 may be converted into interlayer shear stresses within the constrained vibration damping layer 13. In some aspects, these shear stresses may cause viscous strain among the molecules in the viscoelastic vibration damping layer 18 that are converted into heat, which is dissipated. In some aspects, this may further reduce the amplitude of acoustic waves 6 that may be transmitted to subfloor 2. In some aspects, depending on the relative difference in mass density and porosity between the viscoelastic vibration damping layer 18 and subfloor 2, a portion of the remaining acoustic energy may be transmitted through the subfloor 2 as attenuated acoustical waves 19, and a portion of the acoustic energy may be reflected back into AWTA sound proofing membrane 10, where the acoustic waves 6 may be further attenuated by the acoustic absorption layer 12 and the wave transformation layer 11.

In some aspects, as shown in FIG. 5, the AWTA sound proofing membrane 10 within the floor assembly 1d may be adhered to subfloor 2 using a separate membrane adhesive 9, and the floor covering 3 may be adhered to the AWTA sound proofing membrane 10 using a floor covering adhesive 4. In alternative aspects, the AWTA sound proofing membrane 10 may incorporates the membrane adhesive 9 as an integral part of the constrained vibration damping layer 13, which may simplify the installation of the AWTA sound proofing membrane 10 and reduce the time and labor to install the material.

In some aspects, the membrane adhesive 9 may be synonymous with the viscoelastic damping material 18 when incorporated as part of the constrained vibration damping layer 13. In some aspects, the membrane adhesive 9 and/or the viscoelastic damping material 18 may act as an adhesive. In some aspects, the membrane adhesive 9 and/or viscoelastic damping material 18 may act as a pressure sensitive adhesive, which may reduce the time and labor to install the material. In some aspects, the membrane adhesive 9 used as the viscoelastic damping material 18 may include adhesives made of bitumen, modified bitumen, butyl rubber, acrylic, urethane, silicone and so forth to name a few. In some aspects in which modified bitumen is used as the membrane adhesive 9 (and/or the viscoelastic damping layer 18), the modified bitumen (asphalt) may include (but is not limited to) bitumen (asphalt) blended with styrene butadiene rubber, styrene butadiene styrene rubber, styrene isoprene styrene rubber, styrene ethylene butylene styrene rubber, natural rubber, recycled tire rubber, with or without mineral filler, oils or stabilizers with or without tackifying resins used in any combination or weight percentage.

In alternative installation aspects, the AWTA sound proofing membrane 10 may be placed directly onto the subfloor 2 without membrane adhesive 9 and/or without floor covering adhesive 4 to attach the floor covering 3. In some aspects, this may allow the floor covering 3 and/or the AWTA sound proofing membrane 10 to "float" on the subfloor 2. In some other alternative installation aspects, the AWTA sound proofing membrane 10 may be placed directly onto the subfloor 2 without the membrane adhesive 9, and the floor covering 3 may be attached to the AWTA sound proofing membrane 10 with the floor covering adhesive 4. In some aspects, this may allow the AWTA sound proofing membrane 10 to "float" on the subfloor 2.

In some aspects, a process for creating an acoustic wave transformation and attenuation (AWTA) sound proofing membrane 10 may include one or more of the following steps. In some aspects, the process may include a first step of forming an acoustic wave transformation layer 11. In some aspects, the process may include a second step of bonding an acoustic absorption layer 12 to the acoustic wave transformation layer 11. In some aspects, the process may include a third step of bonding the acoustic absorption layer 12 to a constraining face material 17. In some aspects, the process may include a fourth step of bonding a viscoelastic vibration damping layer 18 to the constraining face material 17.

In some aspects, forming the acoustic wave transformation layer 11 in the first step may include bonding a top face sheet layer 14 and a bottom face sheet layer 16 to a wave transformation matrix core layer 15.

In some aspects, the acoustic absorption layer 12 may be bonded to the constraining face material 17 in the third step before the viscoelastic vibration damping layer 18 is bonded to the constraining face material 17 in the fourth step. In some aspects, the acoustic absorption layer 12 may be bonded to the constraining face material 17 in the third step after the viscoelastic vibration damping layer 18 is bonded to the constraining face material 17 in the fourth step.

In some aspects, one or more of bonding the acoustic absorption layer 12 to the acoustic wave transformation layer 11 in the second step, bonding the acoustic absorption layer 12 to the constraining face material 17 in the third step, and bonding the viscoelastic vibration damping layer 18 to the constraining face material 17 in the fourth step may be performed during a manufacturing process. In some aspects, one or more of bonding the acoustic absorption layer 12 to the acoustic wave transformation layer 12 in the second step and bonding the acoustic absorption layer 12 to the constraining face material 17 in the third step may be performed during field installation.

In some aspects, the acoustic wave transformation layer 11 may have a thickness of 2.50 to 27 mm, the acoustic absorption layer 12 may have a thickness of 1 to 12 mm, and the constrained viscoelastic damping layer 13 including the constraining face material 17 and the viscoelastic vibration damping layer 18 may have a thickness of 0.1 to 12 mm.

In some aspects, the process may further include using the AWTA sound barrier membrane 10 between a floor covering 3 and a subfloor 2 for purposes of attenuating impact and or dynamic noise 5 that may pass from the surface of the floor covering 3 through the subfloor 2 into the room below.

In some aspects, the method may further include bonding the acoustic wave transformation and attenuation sound proofing membrane to a subfloor with an adhesive. In some aspects, the acoustic wave transformation and attenuation sound proofing membrane may be not bonded to a subfloor. In some aspects, the method may further include bonding a floor covering to the acoustic wave transformation and attenuation sound proofing membrane with an adhesive. In some aspects, a floor covering may be not bonded to the acoustic wave transformation and attenuation sound proofing membrane.

In some aspects, a process to utilize the AWTA sound proofing membrane, underlayment, and or material 10 as part of a floor assembly 1d may include one or more of the following steps. In some aspects, the process may include a first step of constructing floors and/or subfloors that are part of a building that includes at least 2 or more levels or stories so that the underside of the floor and or subfloor becomes part of or is the ceiling of a room or space below the floor and or subfloor. In some aspects, the process may include a second step of adhering an acoustic wave transformation and attenuation (AWTA) sound proofing membrane 10 on the top or upper side of the floor and/or subfloor 2 using an AWTA sound proofing membrane 10 that contains a membrane adhesive as an integral part of the AWTA sound proofing membrane 10 (e.g., following manufacturer guidelines). In some aspects, the process may include a third step of adhering a floor covering 3 to the AWTA sound proofing membrane 10 using a floor covering adhesive 4 (e.g., following manufacturer guidelines). In some aspects, the process may include a fourth step of finishing the ceiling below the floor assembly as and if desired.

In some alternative aspects, a process to utilize the AWTA sound proofing membrane, underlayment, and or material 10 as part of a floor assembly 1d may include one or more of the following steps. In some aspects, the process may include a first step of constructing floors and or subfloors that are part of a building that includes at least 2 or more levels or stories so that the underside of the floor and or subfloor becomes part of or is the ceiling of a room or space below the floor and or subfloor. In some aspects, the process may include a second step of adhering an AWTA sound proofing membrane on the top or upper side of the floor and or subfloor 2 by applying a membrane adhesive 9 to the floor and or subfloor 2 or to the AWTA sound proofing membrane 10 or to both the floor and/or subfloor 2 and the AWTA sound proofing membrane 10 in one or more steps (e.g., following manufacturer guidelines). In some aspects, the process may include a third step of adhering a floor covering 3 to the AWTA sound proofing membrane 10 using a floor covering adhesive (e.g., following manufacturer guidelines). In some aspects, the process may include a fourth step of finishing the ceiling below the floor assembly 1d as and if desired.

In some further alternative aspects, a process to utilize the acoustic sound proofing membrane, underlayment, and or material 10 as part of a floor assembly 1d may include one or more of the following steps. In some aspects, the process may include a first step of constructing floors and or subfloors 2 that are part of a building that comprises at least 2 or more levels or stories so that the underside of the floor and or subfloor 2 becomes part of or is the ceiling of a room or space below the floor and or subfloor 2. In some aspects, the process may include a second step of placing the AWTA sound proofing membrane 10 on the top or upper side of the floor and/or subfloor 2 so that the AWTA sound proofing membrane 10 floats on the surface and is not adhered to the floor and or subfloor 2 (e.g., following manufacturer guidelines). In some aspects, the process may include a third step of adhering a floor covering 3 to the AWTA sound proofing membrane 10 using a floor covering adhesive 4 (e.g., following manufacturer guidelines). In some aspects, the process may include a fourth step of finishing the ceiling below the floor assembly 1d as and if desired.

In some further alternative aspects, a process to utilize the AWTA sound proofing membrane, underlayment, and or material 10 as part of a floor assembly 1d may include one or more of the following steps. In some aspects, the process may include a first step of constructing floors and/or subfloors 2 that are part of a building that comprises at least 2 or more levels or stories so that the underside of the floor and/or subfloor 2 becomes part of or is the ceiling of a room or space below the floor and/or subfloor 2. In some aspects, the process may include a second step of placing the AWTA sound proofing membrane 10 on the top or upper side of the floor and/or subfloor 2 so that the AWTA sound proofing membrane 10 floats on the surface and is not adhered to the floor and/or subfloor 2 (e.g., following manufacturer guidelines). In some aspects, the process may include a third step of placing a floor covering 3 onto the AWTA sound proofing membrane 10 so that it floats on top of the AWTA sound proofing membrane 10 (e.g., following manufacturer guidelines). In some aspects, the process may include a fourth step of finishing the ceiling below the floor assembly 1d as and if desired.

FIG. 6 illustrates graphically the effectiveness of the AWTA sound proofing membrane 10 according to some aspects by the acoustic spectra with calculated IIC and HIIC results listed in Table 3 below for the floor assemblies 1a, 1b, 1c, and 1d. These test results were generated from actual ASTM E492-09 acoustic tests conducted by Intertek, York, Pennsylvania, an independent accredited acoustical test lab. In FIG. 6, curve 20 shows the acoustic spectrum for the floor assembly 1a, as shown in FIG. 1, where a ceramic floor covering 3 and a thin-set mortar floor covering adhesive 4 are installed directly onto a concrete subfloor 2. In FIG. 6, curve 21 shows the acoustic spectrum for the floor assembly 1b, as shown in FIG. 2, where the ceramic floor covering 3 and thin-set mortar adhesive 4 are installed on top of a conventional non-acoustic floor underlayment 8a placed onto a concrete subfloor 2. In FIG. 6, curve 22 shows the acoustic spectrum for the floor assembly 1c, as shown in FIG. 3, where the ceramic Floor Covering 3 and thin-set mortar Adhesive 4 are installed on top of a conventional acoustic floor underlayment 8b placed onto the concrete subfloor 2. In FIG. 6, curve 23 shows the acoustic spectrum for the floor assembly 1d, as shown in FIG. 5, where the ceramic floor covering 3 and thin-set mortar adhesive 4 are installed on top of the acoustic wave transformation and attenuation (AWTA) sound proofing membrane 10 according to some aspects that is placed onto the concrete Subfloor 2. The vertical axis of the graph shown in FIG. 6 represents the level of acoustic Noise 7 generated by tapping impact Loads 5 on Floor Covering 3 through the Floor Assemblies 1a, 1b, 1c, and 1d described above, resulting in acoustic noise 7 below floor assembly measured in the receiving room as a function of frequency in the 100-3150 Hz bands.

TABLE 3

IIC and HIIC Ratings for Different Floor Assemblies

| Membrane Type | IIC Rating | HIIC Rating |
|---|---|---|
| Floor Assembly 1a - No Floor Underlayment | 29 | 30 |
| Floor Assembly 1b - Conventional Non-Acoustic Floor Underlayment (8a) | 46 | 45 |
| Floor Assembly 1c - Conventional Acoustic Floor Underlayment (8b) | 50 | 49 |
| Floor Assembly 1d - Acoustic Wave Transformation and Attenuation Membrane | 53 | 61 |

The ASTM E492-09 test results demonstrated in FIG. 6 and Table 3 above clearly show that the use of an AWTA sound proofing membrane 10 according to aspects of the invention significantly increases the IIC and dramatically increases the HIIC ratings as tested in these floor assemblies. As shown by the test results, the use of the AWTA sound proofing membrane 10 caused an increase of acoustic attenuation and the reduction in amplitude of the acoustical waves that could be converted into sound in the room below the test chamber from the dynamic and or impact loads generated by ASTM E492-09 tapping machine on the ceramic tile floor surface when compared to the other floor assemblies tested.

In some aspects, different configurations and combinations of the wave transformation matrix core layer 15 such as thickness, constituent materials, cell geometry, cell size, contained gasses, contained solids, contained solid geometry, and/or top and bottom face sheets 14 and 16 may be used to optimize the acoustic wave transformation layer 11, to ideally scatter, disperse, diffuse, and change the wavelength of acoustic waves 6, so that they can be most efficiently absorbed, damped, or blocked by acoustic absorption layer 12 and the constrained vibration damping layer 13. Similarly, in some aspects, different thicknesses, materials, types, and configurations of acoustic absorption materials that comprise the acoustic absorption layer 12, comprise constraining face material(s) 17, and/or comprise viscoelastic vibration damping material(s) 18 may be used to optimize acoustic wave 6 absorption and damping of the shorter wavelength acoustic waves 6 that are transmitted from the acoustic wave transformation Layer 11.

In some aspects, the AWTA sound proofing membrane 10 may be configured to, relative to a bare concrete subfloor 2, reduce the wavelengths of acoustic waves propagating through a concrete subfloor 2 by at least a factor of 10 across the audible frequency range when used with a non-resilient floor covering 3 and without a suspended ceiling used in the room below. In some aspects, the AWTA sound proofing membrane 10 may be capable of increasing the Impact Insulation Class (IIC) rating per American Society for Testing and Materials (ASTM) E3222 of a floor assembly to a minimum of 50 when used with a non-resilient floor covering 3 on a concrete subfloor 2 without a suspended ceiling used in a room below. In some aspects, the AWTA sound proofing membrane 10 may be capable of increasing the IIC rating per ASTM E3222 of a floor assembly to a minimum of 60 when used with a non-resilient floor covering on a concrete subfloor without a suspended ceiling used in the room below.

In some aspects, the AWTA sound proofing membrane 10 may meet all requirements of American National Standard Institute (ANSI) A118.10, ANSI A118.12, and ANSI A118.13 for waterproofing, crack isolation, and sound reduction membranes, which are each incorporated by reference herein in their entireties.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above are described as a sequence of steps, this was done solely for the sake of description. Accordingly, it is contemplated that some steps may be added, some steps may be omitted, the order of the steps may be re-arranged, and some steps may be performed in parallel.

What is claimed is:

1. An acoustic wave transformation and attenuation sound proofing membrane comprising:
    an acoustic wave transformation layer;
    an acoustic absorption layer; and
    a constrained vibration damping layer comprising:
        a constraining face material; and
        a viscoelastic vibration damping layer;
    wherein the acoustic absorption layer is in between the acoustic wave transformation layer and the constrained vibration damping layer;
    wherein a structure of the sound proofing membrane, which includes the acoustic wave transformation layer, the acoustic absorption layer, and the constrained vibration damping layer, is configured to, relative to a bare concrete subfloor, reduce impact noise by at least 12 dB at each frequency within a range of 500 Hz to 3150 Hz.

2. The sound proofing membrane of claim 1, wherein the acoustic wave transformation layer is adhered to the acoustic absorption layer.

3. The sound proofing membrane of claim 1, wherein the constrained vibration damping layer is adhered to the acoustic absorption layer.

4. The sound proofing membrane of claim 1, wherein the sound proofing membrane meets all requirements of American National Standard Institute (ANSI) A118.10, ANSI A118.12, and ANSI A118.13 for waterproofing, crack isolation and sound reduction membranes.

5. The sound proofing membrane of claim 1, wherein the acoustic wave transformation layer comprises a top face sheet layer, a bottom face sheet layer, and an acoustic wave transformation matrix core layer.

6. The sound proofing membrane of claim 5, wherein the top face sheet layer and the bottom face sheet layer are adhered to the acoustic wave transformation matrix core layer so that the acoustic wave transformation matrix core layer is in between the top face sheet layer and the bottom face sheet layer.

7. The sound proofing membrane of claim 5, wherein the acoustic wave transformation matrix core layer comprises a lightweight material.

8. The sound proofing membrane of claim 7, wherein the lightweight material has a mass density equal to or less than 5000 kg/m3.

9. The sound proofing membrane of claim 5, wherein the acoustic wave transformation matrix core layer comprises cells, chambers, and/or compartments, and the cells, chambers, and/or compartments comprise one or more regular or irregular patterns, arrangements, and/or configurations that are arranged randomly and/or orderly and/or both.

10. The sound proofing membrane of claim 9, wherein the cells, chambers, and/or compartments of the wave transformation matrix core layer have one or more geometric configurations.

11. The sound proofing membrane of claim 9, wherein the cells, chambers, and/or compartments of the acoustic wave transformation matrix core layer contain gas or gases.

12. The sound proofing membrane of claim 11, wherein the gas or gases contained in the cells, chambers, and/or compartments of the acoustic wave transformation matrix core layer comprise atmospheric air and/or one or more of nitrogen, carbon dioxide, and helium.

13. The sound proofing membrane of claim 11, wherein the gas or gases contained in the cells, chambers, and/or compartments of the acoustic wave transformation matrix core layer have a mass density of less than 2 kg/m3.

14. The sound proofing membrane of claim 9, wherein the cells, chambers, and/or compartments of the acoustic wave transformation matrix core layer contain lightweight materials.

15. The sound proofing membrane of claim 14, wherein the lightweight materials contained in the cells, chambers, and/or compartments of the wave transformation matrix core layer comprise beads, spheres, particles, grains, expanded glass, hollow spheres, Styrofoam, lightweight volcanic pumice, perlite, gas-filled microspheres, and/or vulcanized rubber.

16. The sound proofing membrane of claim 14, wherein the lightweight materials contained in the cells, chambers, and or compartments of the acoustic wave transformation matrix core layer have a mass density of less than 1000 kg/m$^3$.

17. The sound proofing membrane of claim 9, wherein the cells, chambers, and/or compartments of the acoustic wave transformation matrix core layer create multiple obstructions and/or surfaces that scatter, reflect, diffract, and diffuse sound and vibration from acoustic waves generated by dynamic and/or impact loads on a floor covering.

18. The sound proofing membrane of claim 17, wherein the acoustic wave transformation matrix core layer is capable of increasing a spatial frequency of the incident acoustic wave by a factor of ten or more.

19. The sound proofing membrane of claim 5, wherein the top face sheet layer and the bottom face sheet layer are configured to protect and reduce unwanted contamination of the acoustic wave transformation matrix core layer.

20. The sound proofing membrane of claim 5, wherein the top face sheet layer and/or the bottom face sheet layer contain cells, chambers, and/or compartments that form a part of or form the entire wave transformation matrix core layer.

21. The sound proofing membrane of claim 1, wherein the acoustic absorption layer comprises one or more layers comprising materials including woven or non-woven fabrics, felt, foam, rubber, paper, natural wool, mineral wool, and/or fiberglass.

22. The sound proofing membrane of claim 1, wherein the acoustic absorption layer comprises acoustic metamaterials that are capable of absorbing lower frequency acoustic waves.

23. The sound proofing membrane of claim 1, wherein the acoustic absorption layer is configured to attenuate the transformed acoustic waves from the acoustic wave transformation layer.

24. The sound proofing membrane of claim 1, wherein the constraining face material layer is constructed from materials including metal, plastic, foil, and/or film.

25. The sound proofing membrane of claim 1, wherein the viscoelastic vibration damping layer is a pressure sensitive adhesive.

26. The sound proofing membrane of claim 1, wherein the viscoelastic vibration damping layer comprises bitumen, polymer modified bitumen, vulcanized rubber, urethane, cork, natural or synthetic rubber, and/or vinyl.

27. The sound proofing membrane of claim 1, wherein the viscoelastic vibration damping layer is adhered to the constraining face material layer.

28. The sound proofing membrane of claim 1, wherein the viscoelastic vibration damping layer has a thickness between 0.1 to 12 mm.

29. The sound proofing membrane of claim 1, wherein the structure of the sound proofing membrane is capable of increasing the High Frequency Impact Insulation Class (HIIC) rating per American Society for Testing and Materials (ASTM) E492 of a floor assembly to a minimum of 50 when used with a non-resilient floor covering on a concrete subfloor without a suspended ceiling used in a room below.

30. The sound proofing membrane of claim 1, wherein the structure of the sound proofing membrane is capable of increasing the High Frequency Impact Insulation Class (HIIC) rating per American Society for Testing and Materials (ASTM) E492 of a floor assembly to a minimum of 60 when used with a non-resilient floor covering on a concrete subfloor without a suspended ceiling used in the room below.

31. An acoustic wave transformation and attenuation sound proofing membrane comprising:
  an acoustic wave transformation layer;
  an acoustic absorption layer; and
  a constrained vibration damping layer comprising:
    a constraining face material; and
    a viscoelastic vibration damping layer;
  wherein the acoustic absorption layer is in between the acoustic wave transformation layer and the constrained vibration damping layer;
  wherein a structure of the sound proofing membrane, which includes the acoustic wave transformation layer, the acoustic absorption layer, and the constrained vibration damping layer, is configured to, relative to a bare concrete subfloor, reduce wavelengths of acoustic noise propagating through a concrete subfloor at each frequency within a range of 400 Hz to 3150 Hz by at least a factor of 10 when used with a non-resilient floor covering and without a suspended ceiling in the room below.

32. A method for creating an acoustic wave transformation and attenuation sound proofing membrane, the method comprising:
  forming an acoustic wave transformation layer;
  bonding an acoustic absorption layer to the acoustic wave transformation layer;
  bonding the acoustic absorption layer to a constraining face material; and
  bonding a viscoelastic vibration damping layer to the constraining face material;
  wherein a structure of the sound proofing membrane, which includes the acoustic wave transformation layer, the acoustic absorption layer, and the constrained vibration damping layer, is configured to, relative to a bare concrete subfloor, reduce impact noise by at least 12 dB at each frequency within a range of 500 Hz to 3150 Hz.

33. The method of claim 32, wherein forming the acoustic wave transformation layer comprises bonding a top face sheet layer and a bottom face sheet layer to a wave transformation matrix core layer.

34. The method of claim 32, wherein one or more of bonding the acoustic absorption layer to the acoustic wave transformation layer, bonding the acoustic absorption layer to the constraining face material, and bonding the viscoelastic vibration damping layer to the constraining face material are performed during a manufacturing process.

35. The method of claim 32, wherein one or more of bonding the acoustic absorption layer to the acoustic wave transformation layer and bonding the acoustic absorption layer to the constraining face material are performed during field installation.

36. The method of claim 32, wherein the acoustic wave transformation layer has a thickness of 2.50 to 27 mm, the acoustic absorption layer has a thickness of 1 to 12 mm, and the constrained viscoelastic damping layer has a thickness of 0.1 to 12 mm.

37. The method of claim 32, further comprising using the acoustic wave transformation and attenuation sound barrier membrane between a floor covering and a subfloor for purposes of attenuating impact and or dynamic noise that may pass from the surface of the floor covering through the subfloor into the room below.

38. The method of claim 32, further comprising bonding the acoustic wave transformation and attenuation sound proofing membrane to a subfloor with an adhesive.

39. The method of claim 32, wherein the acoustic wave transformation and attenuation sound proofing membrane is not bonded to a subfloor.

40. The method of claim 32, further comprising bonding a floor covering to the acoustic wave transformation and attenuation sound proofing membrane with an adhesive.

41. The method of claim 32, wherein a floor covering is not bonded to the acoustic wave transformation and attenuation sound proofing membrane.

42. The method of claim 32, wherein the acoustic absorption layer is bonded to the constraining face material before the viscoelastic vibration damping layer is bonded to the constraining face material.

43. The method of claim 32, wherein the acoustic absorption layer is bonded to the constraining face material after the viscoelastic vibration damping layer is bonded to the constraining face material.

44. The sound proofing membrane of claim 1, wherein the structure of the sound proofing membrane is configured to, relative to the bare concrete subfloor, reduce impact noise by at least 40 dB at a frequency of 3150 Hz.

45. The sound proofing membrane of claim 44, wherein the structure of the sound proofing membrane is configured to, relative to the bare concrete subfloor, reduce impact noise by at least 30 dB at a frequency of 2000 Hz.

46. The sound proofing membrane of claim 45, wherein the sound proofing membrane is configured to, relative to the bare concrete subfloor, reduce impact noise by at least 20 dB at a frequency of 1000 Hz.

47. The sound proofing membrane of claim 46, wherein the sound proofing membrane is configured to, relative to the bare concrete subfloor, reduce impact noise by at least 20 dB at a wavelength of 800 Hz.

48. A method for using an acoustic wave transformation and attenuation sound proofing membrane, the method comprising:
using a structure of the sound proofing membrane, which includes an acoustic wave transformation layer, an acoustic absorption layer, and a constrained vibration damping layer, to, relative to a bare concrete subfloor, reduce impact noise by at least 12 dB at each frequency within a range of 500 Hz to 3150 Hz, wherein the constrained vibration damping layer comprises a constraining face material and a viscoelastic vibration damping layer, and the acoustic absorption layer is in between the acoustic wave transformation layer and the constrained vibration damping layer.

* * * * *